US009259796B2

(12) United States Patent
Peters et al.

(10) Patent No.: US 9,259,796 B2
(45) Date of Patent: Feb. 16, 2016

(54) SYNERGIC TIG WELDING SYSTEM

(75) Inventors: Steven R. Peters, Huntsburg, OH (US); Elliott K. Stava, Sagamore Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 3149 days.

(21) Appl. No.: 11/331,869

(22) Filed: Jan. 17, 2006

(65) Prior Publication Data

US 2007/0164007 A1    Jul. 19, 2007

(51) Int. Cl.
  *B23K 9/10*   (2006.01)
  *B23K 9/09*   (2006.01)
  *B23K 9/095*  (2006.01)

(52) U.S. Cl.
  CPC ............... *B23K 9/091* (2013.01); *B23K 9/0953* (2013.01)

(58) Field of Classification Search
  CPC ........... B23K 9/10; B23K 9/091; B23K 9/092
  USPC ....... 219/137.7, 137 PS, 130.1, 130.5, 130.51
  See application file for complete search history.

(56) References Cited

U.S. PATENT DOCUMENTS

| | | | |
|---|---|---|---|
| 4,038,515 A | 7/1977 | Risberg | |
| 4,479,046 A | 10/1984 | Mizuno | |
| 4,861,965 A | 8/1989 | Stava | |
| 5,003,154 A * | 3/1991 | Parks et al. | 219/137 PS |
| 5,225,660 A | 7/1993 | Mita | |
| 5,278,390 A | 1/1994 | Blankenship | |
| 5,683,602 A * | 11/1997 | Stava | 219/137 PS |
| 6,365,874 B1 | 4/2002 | Stava | |
| 6,498,321 B1 | 12/2002 | Fulmer | |
| 6,515,259 B1 * | 2/2003 | Hsu et al. | 219/130.51 |
| 6,717,108 B2 | 4/2004 | Hsu | |
| 2005/0051525 A1 | 3/2005 | Yamada | |

FOREIGN PATENT DOCUMENTS

| | | |
|---|---|---|
| EP | 1249297 A | 10/2002 |
| EP | 1439021 A | 7/2004 |
| JP | 04 279279 A | 10/1992 |

OTHER PUBLICATIONS

European Search Report—European Patent Application No. EP 06 01 0047—Date of completion of search Oct. 26, 2007, The Hague.
Communication dated May 15, 2007—E 106 0191; App. No./Pat. No. 06026014.8-2302; Applicant Lincoln Global, Inc.
European Search Report w/ Annex and Abstract-(06026014.8)—European Patent Application No. EP 06 02 6014—Date of completion of search May 2, 2007, Munich.

(Continued)

*Primary Examiner* — Dana Ross
*Assistant Examiner* — Ayub Maye
(74) *Attorney, Agent, or Firm* — Hahn Loeser & Parks LLP

(57) ABSTRACT

There is provided an improved TIG welder comprising a power source for performing an AC TIG welding process across an electrode and a workpiece with a controller for creating an AC waveform. The controller having a synergic input device with an input for receiving a signal level representing a desired set current for the welding process and an output signal determining an aspect of the waveform and representing a non-linear relationship between peak positive current and peak negative current for certain desired set welding currents.

58 Claims, 10 Drawing Sheets

(56) References Cited

OTHER PUBLICATIONS

Examiner's first report, patent application No. 2006208415, Jan. 31, 2008.

Examiner's report No. 2, patent application No. 2006208415, Oct. 23, 2008.

Chinese Office Action, Sep. 12, 2008.

* cited by examiner

| | FIG. 6 | | $D_N = 2D_P$ | | |
|---|---|---|---|---|---|
| SET | $k_P$ | $k_N$ | $D_P$(ms) | $D_N$(ms) | f |
| 5 | 5 | 5 | 1 | 2 | 333 |
| 50 | 50 | 50 | 3.8 | 7.5 | 88 |
| 100 | 100 | 100 | 6.5 | 13 | 50 |
| 150 | 100 | 160 | 6.5 | 13 | 50 |

SYNERGIC TIG WELDING SYSTEM

The invention relates to the field of electric arc welding and more particularly to an improvement in the waveform control of a welder for performing a TIG welding process.

INCORPORATION BY REFERENCE

GTAW or TIG welding involves use of a non-consumable electrode, such as a tungsten electrode, where current from a power source creates an arc between the electrode and workpiece for melting and joining the workpiece. Especially for metals such as aluminum, it is common practice to use an AC waveform for TIG welding. The electrode negative section of the waveform is used to perform the basic welding procedure and the electrode positive section of the waveform is used to clean the workpiece for assisting in the bonding procedure. Representative patents relating to AC TIG welding are Risberg U.S. Pat. No. 4,038,515; Stava U.S. Pat. No. 4,861,965; and, Stava U.S. Pat. No. 5,683,602. These AC TIG welders often have balanced AC welding, such as shown in Stava U.S. Pat. No. 5,683,602; however, for TIG welding of aluminum, the AC welding is often unbalanced as shown in Risberg U.S. Pat. No. 4,038,515 and Stava U.S. Pat. No. 4,861,965. These three TIG welding patents are incorporated by reference herein as background technology applicable to the present invention. The preferred embodiment of the invention utilizes a power source control technique for an inverter type power source, which technique involves the use of a digital waveform generator to control the pulsed profile of the welder current. Such waveform generator creates a series of switching signals directed to a pulse width modulator operated in accordance with the output of the waveform generator to control the actual profile of the pulses being created for electric arc welding. This technology was originated by assignee of the present invention, as described in Blankenship U.S. Pat. No. 5,278,390. This control technique utilizing a waveform generator to determine the waveform profile of an inverter type power source is also disclosed in Fulmer U.S. Pat. No. 6,498,321. The early Blankenship patent and the representative Fulmer patent, together with Stava U.S. Pat. No. 6,365,874 are incorporated by reference for background regarding the control technique where a waveform generator controls the profile of the output current waveform. The Blankenship patent, together with Hsu U.S. Pat. No. 6,717,108, illustrates the now common technique of using a memory stored state table for use by the waveform generator. A state table controls a particular waveform and is stored in memory. It is outputted to the waveform generator to create the desired current profile. This control technique is employed in the preferred embodiment of the present invention; therefore, Hsu U.S. Pat. No. 6,717,108 is also incorporated by reference to further illustrate background technology to the present invention. The totality of technology disclosed in these many patents constitutes the general state of the art to which the present invention is directed. They constitute background to the invention so the vast amount of well known background technology need not be repeated for an understanding of the improvement forming the present invention.

BACKGROUND OF INVENTION

In gas tungsten arc welding, sometimes referred to as TIG welding, the output current can be provided by any number of constant current power sources. Most metals are capable of being welded by the GTAW or TIG welding process; however, they are generally welded by a DC negative arc using an inert gas atmosphere. When welding aluminum or magnesium using the TIG welding process, the current is generally AC with an electrode positive current section and an electrode negative current section. These two sections are balanced to a limited extent using known technology; however, more recently, variable polarity power sources have become available. Using inverter technology with a waveform generator, as pioneered by assignee of the present invention, the positive current section and the negative current section of the waveform for TIG welding can be adjusted in shape, amplitude and duration. AC TIG welding of the variable AC waveform type is performed with a pure tungsten electrode. The size of the electrode is determined by the application and the current range required for the welding process. If a given size electrode is welded at a positive current or positive heat energy above its desired range of operation, the tungsten electrode may become too hot and the electrode will "spit" metal from its molten tip into the welding pool. This is not acceptable. In most cases, the electrode spitting occurs in the positive half cycle or section of the waveform when the instantaneous positive current is too high for the particular electrode being used. In common AC TIG welding, duration of the different current sections are controlled for adjusting the welding process to the desired conditions. This duration adjustment is a direct linear relationship with greater negative penetration durations and greater positive clean durations as the set current is increased. Such control does not address the problem of electrode spitting by overheating the tip of the electrode.

TIG welding with an AC waveform using the inverter type technology is performed by using a square wave positive current section and a square wave negative current section. The average current for the TIG welding is generally obtained by multiplying the positive current by the positive duration and the negative current by the negative duration. These functions are then added and divided by the total duration of both current sections. When performing a TIG welding process, the average current is generally set by the operator or adjusted by a foot pedal. The set current is maintained by controlling the current during both the positive and negative portions of the AC waveform. However, it is not unusual to adjust or set the current based upon the current during the negative polarity waveform, since this portion of the waveform is used for heating and penetration while the positive portion is merely used for cleaning the workpiece. To provide desired TIG welding results, as mentioned earlier, the cleaning duration is adjusted in a direct relationship with respect to the penetration duration based upon the desired TIG welding current, whether the average current or the negative penetration current. The direct relationship of durations means cleaning is increased as penetration is increased. This relationship of durations may be scaled. Thus, TIG welding systems or welders feature a method to adjust the waveform balance between penetration and cleaning based upon the set current, either average or negative. This balance concept does not address a basic concern in TIG welding wherein the current of the positive half cycle merely increases as the set current increases. Thus, at high currents, there is a tendency for the tungsten electrode to "spit" molten metal from the tip of the electrode into the melted puddle on the workpiece. This event is not acceptable in high quality TIG welding.

THE INVENTION

In accordance with the present invention, a synergic device controls the AC waveform so the positive current or energy is limited to a given value that provides enough cleaning action, yet prevents spitting. The energy of the positive section of the waveform is the integration of the instantaneous watts during each positive half cycle. Another aspect of the invention is reducing the duration of the positive half cycle as the set current is increased. In the past, duration adjustment has been a generally direct relationship. The primary aspect of the present invention is a synergic device to adjust the relationship between the positive current and the negative current so that as the average current increases, there is a set current or energy above which the positive current remains constant. This positive current is the current below which spitting of the electrode occurs. Thus, there is a non-linear relationship between the amplitude of the positive half cycle and the negative half cycle based upon the set current of the TIG welder. The current can be the average current or the negative penetration current. An inverse relationship is established between the set current and the relative durations between the positive duration for cleaning and the negative duration for penetration. The adjustment of the relative durations may include a constant positive duration after a given set current. But, in accordance with the overall basic feature, the current of the positive half cycle is limited to prevent electrode spitting. At low currents, such as 50 amperes, the positive and negative half cycles are both regulated to 50 amperes when the average current is to be 50 amperes. At higher currents when the average current is to be elevated, such as 200 amperes, the positive half cycle is limited to a set value, for instance 150 amperes based upon electrode size and chemistry. This is the level above which the electrode will start spitting. The negative half cycle current is increased to allow the average current to meet the preset average current value. In summary, at a low level, such as 50 amperes, the negative and positive currents are 50 amperes. At higher set current levels the average current is obtained by increasing the negative current while maintaining the positive current at a constant value. Thus, the positive current is limited by one embodiment of the present invention. This feature is combined with other synergic control devices to establish synergic relationships of AC parameter, such as adjusting the relative duration of the positive and negative half cycles in specific ways set by function generators constituting synergic waveform control devices. Such synergistic control devices optimize the cleaning and penetration without causing undue spitting of the electrode. Another embodiment limits the energy of the positive section of an AC TIG waveform.

With the advent of waveform generators to control the output pulses of the TIG welder, it is now possible to adjust the frequency of the waveform over a large controlled range. It has been found that at low current settings, a TIG welding system can provide a focused arc column by drastically increasing the frequency of the waveform. However, at higher preset current levels, increased frequencies to focus the arc column produces unwanted levels of environmental noise, making the arc column focus less acceptable in view of the unacceptable noise level. Thus, another aspect of the present invention is providing a synergic device for controlling the frequency of the TIG welding process based upon the preset current of the process. At low currents, the frequency is high to focus the arc column. As the current increases, the frequency is decreased to reduce the noise associated with high frequency and high current. One of the novel synergic waveform control devices establishes a relationship between the preset current and frequency to create a rapid decrease in frequency with low current increases to a given level. Then a uniform frequency is provided at higher set current levels. This reduces unwanted noise.

The present invention relates to synergic control of a TIG welding system wherein the set current controls frequency, amplitude or duration of the positive and negative half cycles of a TIG waveform in accordance with a relationship established by a function generator or like signal converter. In one aspect of the invention, the magnitude of the current or heat energy in the positive half cycle is limited to prevent spitting of the electrode. In another aspect, the frequency of the waveform is adjusted to provide focus of the arc column at low currents; however, the signal converter at high current provides low frequency to prevent unwanted environmental noise. Furthermore, another synergic device can establish a unique relationship between the positive and negative durations at different set welding currents. This duration relationship is not merely a scaled direct relationship, but a synergic relationship with the positive duration becoming generally constant at a given current or the positive duration remaining constant or reducing as the set current increases the negative duration.

In accordance with the invention, there is provided an improvement in a TIG welder of the type having a power source forming an AC TIG welding process across an electrode and a workpiece. The power source has a first output lead connected to the electrode, a second output lead connected to the workpiece and a controller for creating an AC waveform across the power leads wherein the AC waveform has a positive current section with a first duration and a peak positive current and a negative current section with a second duration and a peak negative current. The improvement in the TIG welder is use of a controller having a synergic input device with an input for receiving a signal level representing a desired set current for the TIG welding process and an output signal determining an aspect of the waveform and representing a non-linear relationship between the peak positive current and the peak negative current for certain desired set currents. In accordance with the preferred embodiment, the non-linear relationship involves a generally constant positive current or energy as the negative peak is increased beyond a given amount. This constant positive peak current is in the general range of 100-150 amperes depending upon the electrode size. The constant heat energy is in the range of 2-5 Joules depending upon the electrode size. Heat is the real issue, but as a practical matter, heat to melt the electrode is controlled by the positive current of an AC waveform.

In accordance with the preferred embodiment, the power source is an inverter operated at a frequency generally greater than 18 kHz and the AC waveform is created by a digital waveform generator controlling the inverter by a pulse width modulator.

Implementation of the present invention involves several features, such as making the second duration substantially greater than the first duration so that the penetration cycle lasts longer than the cleaning cycle. In addition, an implementation of the present invention involves a second synergic input device with an input receiving a signal representative of the desired set current for the welding process and an output signal determining an aspect of the waveform and representing a relationship between the first and second duration for certain desired set currents. The duration relationship is not merely increasing the positive duration and negative duration with increased set current or adjusting the balance in a linear fashion with changes in the welding current. In this manner, the first aspect of the invention regarding the maximum current for cleaning, includes a second synergic device for controlling the relative duration of the clean and penetration cycles.

A further implementation of the present invention involves another synergic input device with an input receiving a signal representative of the desired set current for the welding process and an output signal determining an aspect of the waveform and representing a relationship between the frequency of the waveform for certain desired set currents. Thus, as the current is increased, the frequency can be decreased to reduce the amount of undesirable noise.

In the preferred embodiment, the set current is the average current of the welding process; however, the set current can also be the negative current of the TIG welding process The primary object of the present invention is the provision of a TIG welder having one synergic control device of the type that limits the positive current or energy to a level below the current or energy causing spitting of the tungsten electrode and a second synergic input device for decreasing the frequency of the TIG welding process as the set current increases. High frequency at low current focuses the arc column. The reduction in frequency by the second synergic device reduces the unwanted noise of the system.

Another object of the present invention is the provision of a TIG welder, as defined above, which TIG welder has one or more synergic devices driving the waveform generator whereby parameters of the waveform created by the waveform generator are adjusted by a unique relationship as the desired set current is adjusted by the operator.

These and other objects and advantages will become apparent from the following description taken together with the accompanying drawings.

PREFERRED EMBODIMENT

Figure 1:
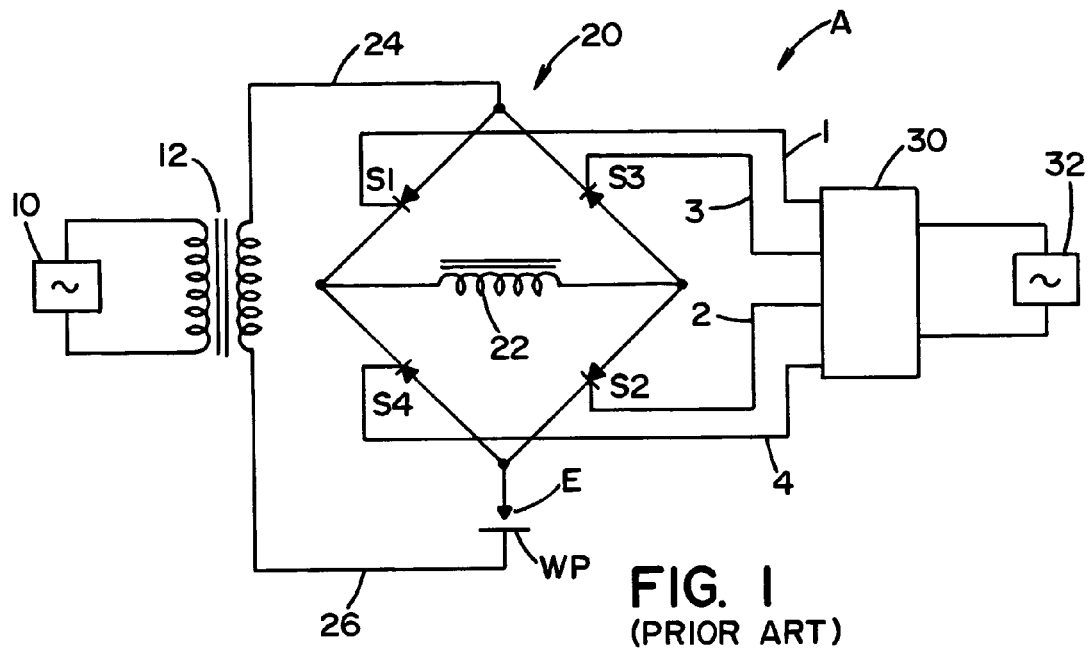
FIG. 1 is a wiring diagram schematically illustrating a standard AC TIG welder of the transformer based type.

AC TIG welding includes a positive half cycle and a negative half cycle referred to as the positive current section and the negative current section. Such welding is performed with a minimum current generally in the range of 5.0 amperes to an extremely high current in the neighborhood of 300-500 amperes. The positive half cycle is used for cleaning and the negative half cycle is used for welding or penetration and transfers heat to the workpiece. Different relationships of current and duration for the cleaning cycle and the penetration cycle are desirable for different set welding currents. AC TIG welders, for years, have been powered with a transformer based power source using SCRs as shown in FIG. 1. This type device is described in Stava U.S. Pat. No. 4,861,965; however, it is difficult to optimize the positive half cycle and the negative half cycle at different set current levels. Many functional constraints of the prior art welder shown in FIG. 1 have been overcome by an inverter based power source for an AC TIG welder as generally disclosed in FIG. 2. The AC waveform is controlled by digital data stored in memory and loaded into a waveform generator. Even with the capabilities of the inverter based power source, AC TIG welders have included few tailored functional relationships between the positive half cycle and the negative half cycle at different welding currents. At best, the positive current and negative current are increased linearly as the TIG welding current increases. In some TIG welders, balance of the duration of the positive half cycle and the duration of the negative half cycle is controlled with respect to the set current. This balance control is sometimes scaled for variations at different currents. Control of duration and balance of duration are not synergic controls since the function relationship for durations is linear and a direct function, i.e. with increased duration of the negative cycle there is an increase in the positive cycle.

The present invention is an improvement in this type of technology wherein specific synergic control devices are incorporated into the waveform generator for adjusting parameters of the negative half cycle and positive half cycle in an AC TIG welding process.

Figure 2:
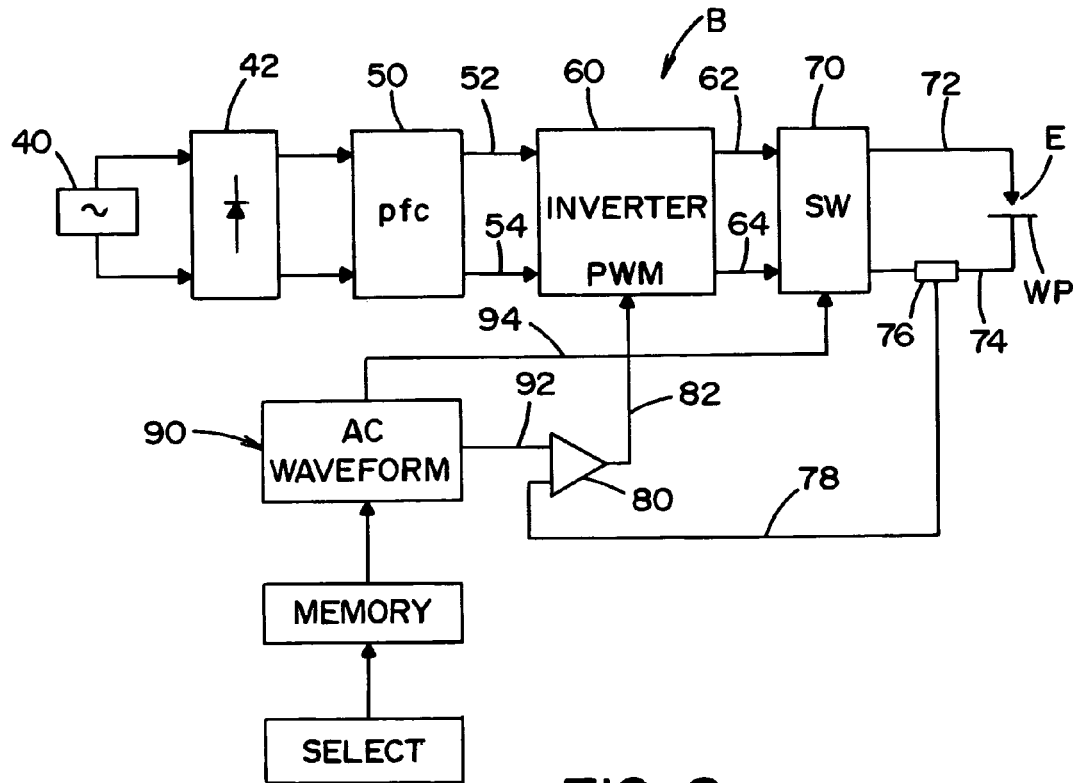
FIG. 2 is a block diagram schematically illustrating a TIG welder of the inverter based type wherein a waveform generator controls the AC waveform during the TIG welding process.
Figure 3:
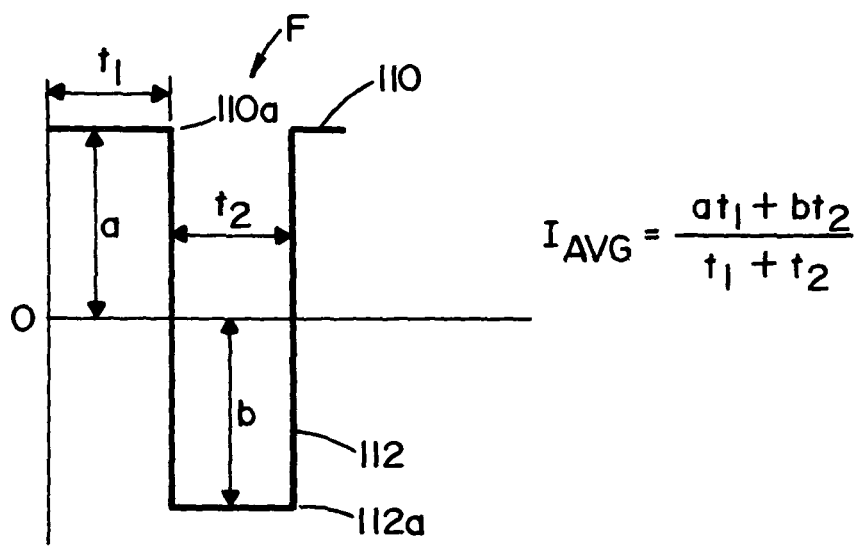
FIG. 3 is a current graph of a standard AC TIG welding waveform as created by the inverter based prior art welder shown in FIG. 2.

Common prior art TIG welders are shown in FIGS. 1 and 2 wherein welder A is driven by power supply 10 connected to transformer 12 providing a DC signal on leads 24, 26 to AC rectifier 20 having an internal choke 22 for providing an AC signal across electrode E and workpiece WP. The duration of the positive and negative portions of the AC waveform are controlled by the trigger pulses in lines 1, 2, 3 and 4 from controller 30 receiving power from auxiliary power supply 32. The AC TIG welding waveform provided by the transformer based welder A is generally a square wave with an adjustment between the duration of the positive half cycle and the duration of the negative half cycle. To obtain better control over the AC waveform, an inverter based welder, such as welder B, is now commonly used for AC TIG welding. This type of welder is schematically illustrated in FIG. 2 as including input power supply 40 connected to rectifier 42 for outputting a first DC signal to the input of power factor correcting boost or buck converter 50 having a second DC output signal across leads 52, 54 forming the input to high frequency inverter 60. In accordance with standard technology, invert 60 is operated by a pulse width modulator creating pulses at a frequency greater than 18 kHz and preferably greater than 20 kHz. These high frequency pulses from inverter 60 creates a waveform with a profile formed by many closely spaced pulses across output leads 62, 64. The waveform across the output leads has a single polarity and is directed to the input of polarity switch 70 having a positive polarity condition and a negative polarity condition to provide an AC TIG welding signal across output leads 72, 74 connected to electrode E and workpiece WP, respectively. Shunt 76 senses the real time or instantaneous current through lead 74 and produces a voltage signal on lines 78 representative of the real time instantaneous current of the welding process. In summary, the DC signal across lines 52, 54 is converted into high frequency pulses having a profile determined by the pulse width modulator of inverter 60. The waveform profile constitutes the waveform of the DC signal directed to the input of polarity switch 70. To adjust the profile of the waveform to provide the desired AC signal across electrode E and workpiece WP, a voltage signal on line 78 is directed to one input of error amplifier 80. AC waveform generator 90 creates an output signal on line 92 forming the second input to error amplifier 80. The profile signal on output line 92 is compared to the actual current on line 78 to create a profile signal on line 82 directed to the pulse width modulator at the input of the controller for inverter 60. Digital waveform generator 90 has an output 94 with a logic that changes according to the desired polarity of the waveform at any given time in a cycle. This logic signal is directed to the input of switch 70. Thus, the profile of the waveform is controlled by the pulse width modulator at any given time based upon the signal on line 82. The polarity of the profile is determined by the logic on line 94. The various controls of inverter 60 are normally digital and are performed by a DSP or microprocessor in accordance with standard controller technology. Components are illustrated in block diagram only to show the subroutine and the function of the digital processing device used to accomplish the AC waveform for TIG welding by welder B. Welders A and B are standard units used in AC TIG welding in the electric arc welding field. These welders produce an AC waveform F as schematically illustrated in FIG. 3. The positive current section 110 and the negative current section 112 are combined to form one cycle of waveform F. In accordance with standard terminology, positive section 110 has a amplitude a and duration $t_1$. In a like manner, negative section 112 has amplitude b and duration $t_2$. The cycle time is the sum of $t_1$, $t_2$. The cycle time is the reciprocal of the frequency of waveform F. Current 110a is the peak current for the positive half cycle and current 112a is the peak current for the negative half cycle. In practice, $t_1$ generally equals $t_2$; however, a is normally less than b. The average current for the waveform is set forth by the equation in FIG. 3 wherein the product of amplitude a, as an absolute number, and duration $t_1$ is added to the product of amplitude b, as an absolute number and $t_2$. This value is then divided by the total cycle time $t_1+t_2$ to produce the average current as used in the AC TIG welding process. Control of the synergic input devices of the present invention are preferably based upon the average current; however, the adjusted positive peak current 112a is the penetration current and can be used for controlling the synergic input devices of the present invention.

Figure 4:
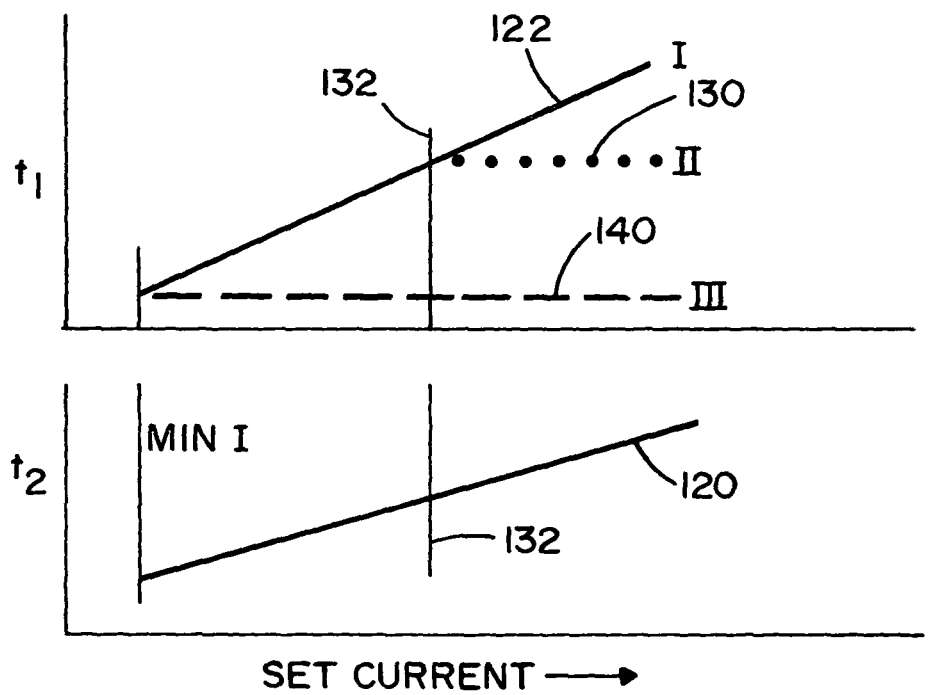
FIG. 4 is a graph showing the output of the synergic function generator in relationship to preset current for the TIG welding process compared with a standard adjustment concept.
Figure 5:
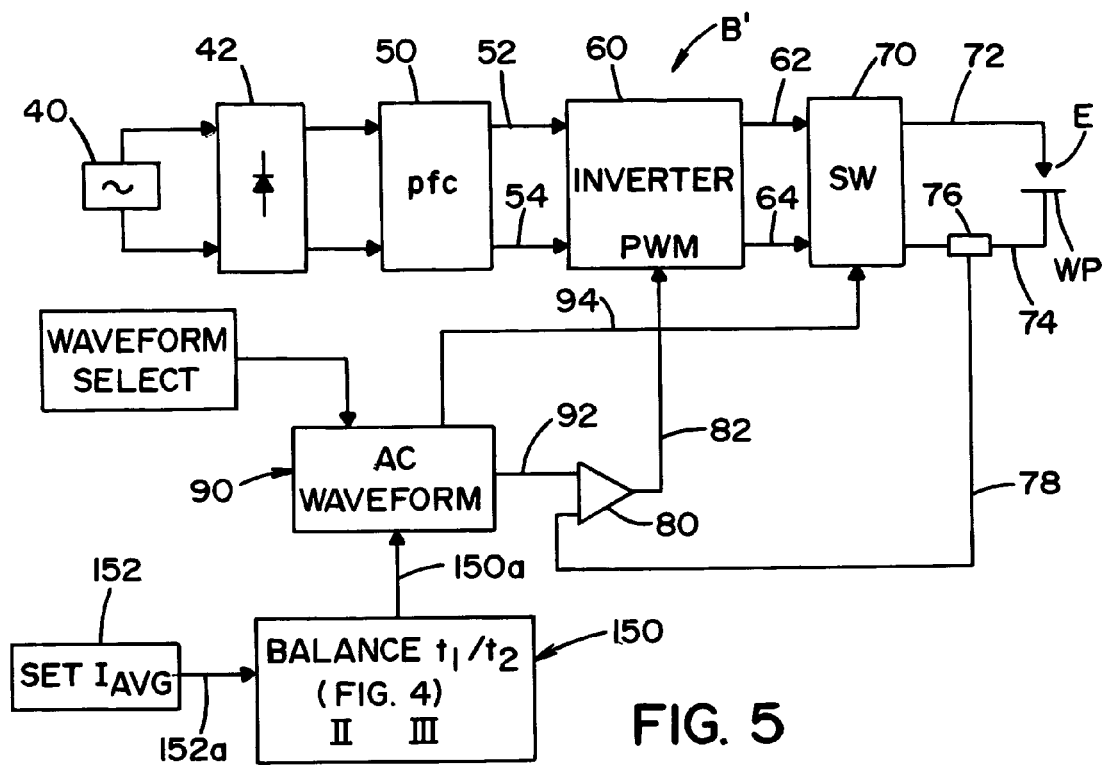
FIG. 5 is a block diagram of a DC welder for performing an AC waveform using the synergic device controlled by versions II and III of the function generator set forth in FIG. 4.

In practicing the invention, a TIG welder, such as shown in FIG. 2, is modified to include a synergic device to operate in accordance with a function generator so the set welding current of the welder produces a desired relationship between the set current and parameters of the positive cleaning cycle and/or the negative penetration cycle. One of the novel synergic relationships implemented by the invention is shown by curves II and III illustrated in FIG. 4. These curves are the synergic function f(x) for values of $I_{avg}$. This means the setting of current produces a specific parameter relationship that is unique in TIG welding. The output of a function generator is based upon an input set current for curves II and III. In accordance with the prior art, an imbalance between the positive section and the negative section is sometimes implemented when the set current of the welder is changed. This prior art scheme is curve I shown by parallel lines 120, 122 of FIG. 4. As the set current of the welder increases beyond the minimum current, the duration of the negative half cycle increases as indicated by line 120. At the same time, the duration of the positive half cycle increases along line 122 which is curve I. These are linear lines which may or may not be parallel, but are shown parallel. In some prior art the linear relationship is duration balance where the positive duration has a different percentage of the negative duration. This is a linear function and not synergic or unique. In accordance with the invention the relationship of the duration for the positive half cycle is not merely a scale parallel relationship or balance. Indeed, in one synergic concept, after a given set current indicated by line 132, positive polarity $t_1$ remains substantially constant as indicated by line 130. This is shown as curve II between the negative section duration and the positive section duration. The positive section remains constant after the current shown as line 132. In accordance with another synergic relationship, line 140 indicates that the duration of the half cycle remains the same or actually decreases as the set current increases. As the set current increases, the negative polarity duration shown as line 120 increases. The positive polarity duration is constant at line 140 forming curve II. The showing in FIG. 4 illustrates three relationships of the positive duration. In accordance with standard technology, the duration of the positive half cycle increases along parallel line 122 indicating version or curve I. This does not optimize the relationship between two durations. To optimize this relationship, version or curve II is processed, wherein the positive duration remains constant along line 130 after set current at line 132. In version or curve III the duration remains the same or actually decreases with increases in set current as represented by line 140 comprising curve III. Welder B' shown in FIG. 5 implements the curves II and III of the function generator relationship by use of synergic control device 150 having an input 152 for adjusting the set current of welder B. Output 152a of set current device 152 implements either version II or version III shown in FIG. 4 so that waveform generator 90 is modified by the signal on line 150a to create a profile in line 92 and a polarity signal 94 that implements one of the two versions of the present invention. The duration of the positive portion is either a non-linear relationship of line 122 transitioning into line 130 or an inverse relationship of line 140.

Figure 6:
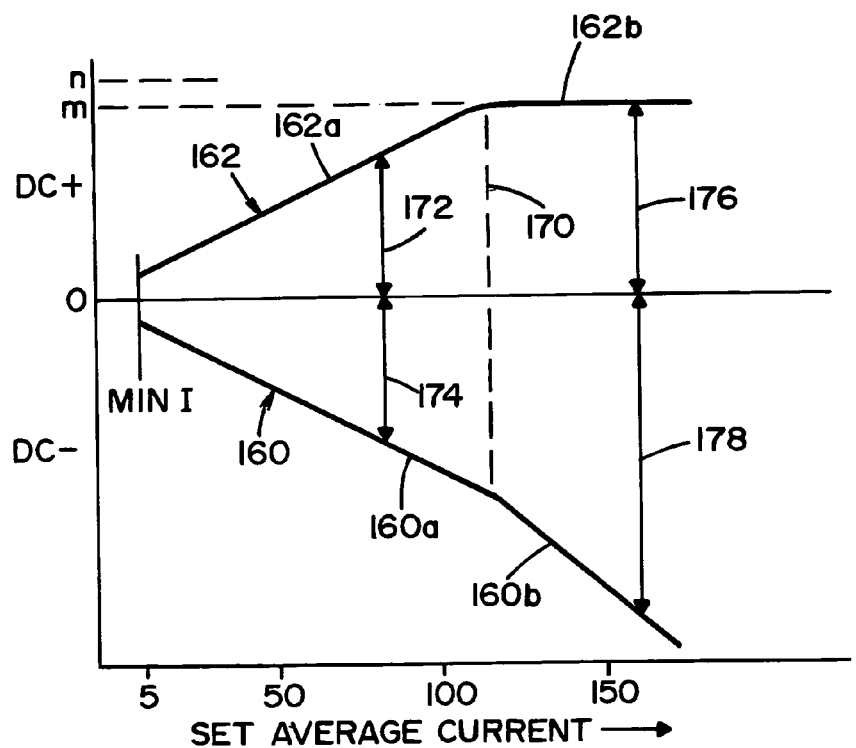
FIG. 6 is a graph of the function generator curves for a synergic device constructed in accordance with the preferred embodiment of the present invention.
Figure 7:
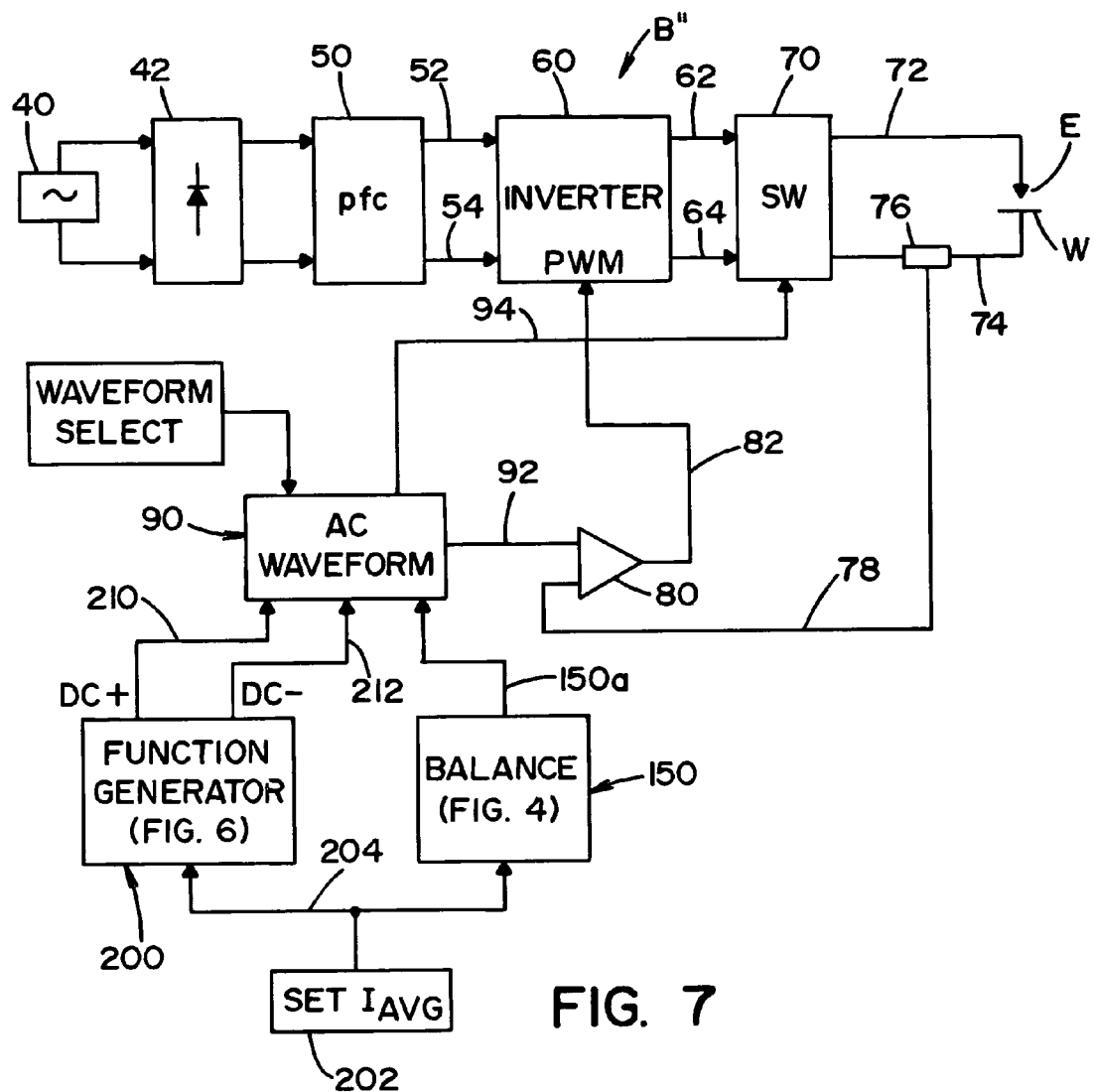
FIG. 7 is a block diagram of a TIG welder having two synergic input devices as schematically illustrated by the function generator curves of FIG. 4 and FIG. 6.
Figure 8:
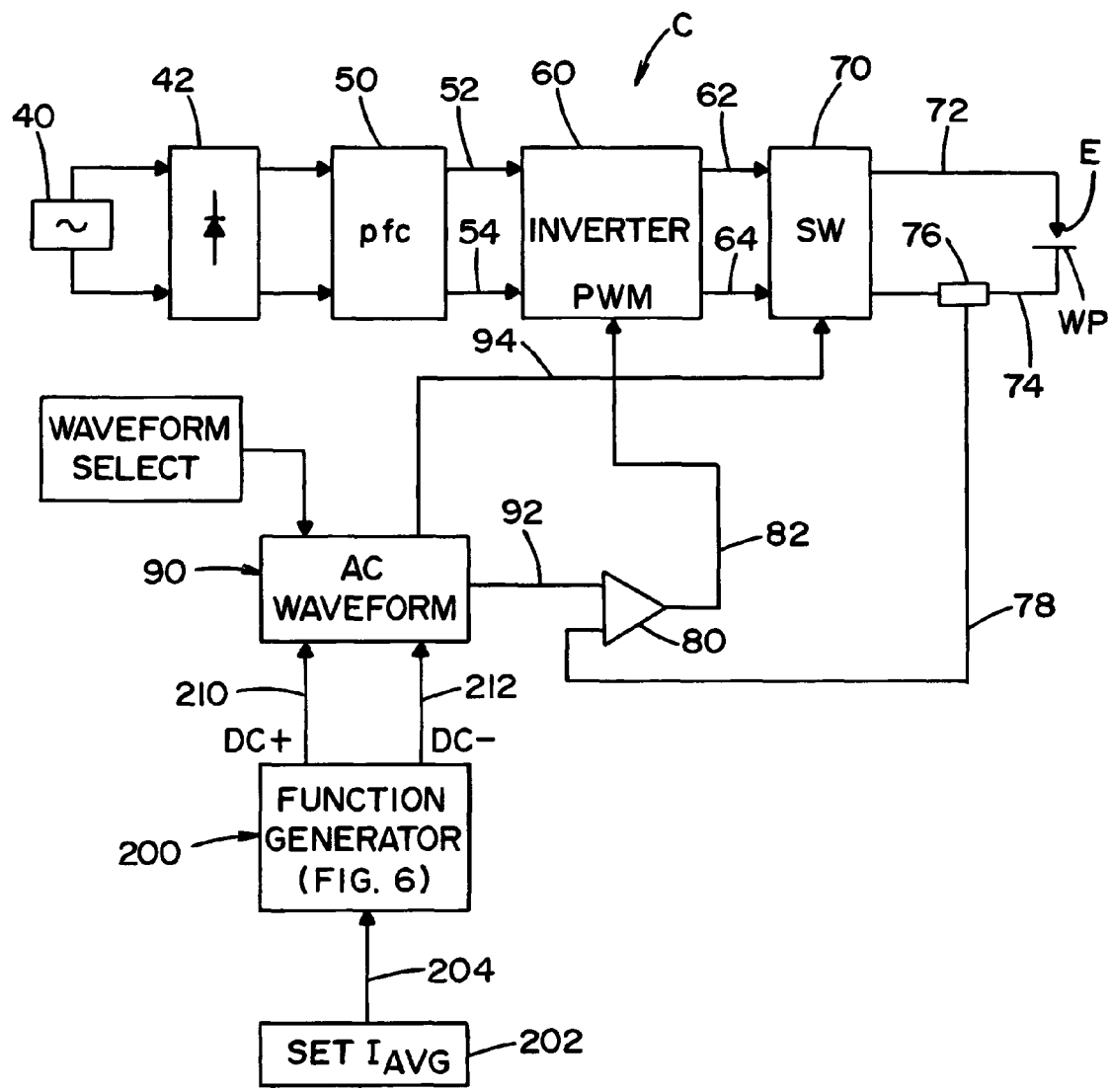
FIG. 8 is a block diagram of the TIG welder shown in FIG. 7 utilizing only the primary synergic device having a function generator curve, as shown in FIG. 6.

The primary aspect of the present invention is the use of a non-linear function generator for controlling the positive half cycle and negative half cycle of an AC TIG welder in accordance with the set welding current. This concept is illustrated in FIG. 6 wherein the DC negative current is represented by curve 160 and the DC positive current is represented by curve 162. These two curves are linear and progress in accordance with standard technology until the set current at point 170. At this current, the straight portion 160a of curve 160 and straight portion 162a of curve 162 become non-linear. Curve 162 transitions into horizontal portion 162b. The positive current of the AC waveform is constant at value m. Value m is slightly less than current value n which is the current that causes spitting of tungsten into the molten weld metal. Thus, as the average set current increases beyond point 170, the positive current remains constant. This means that it does not increase beyond value m. Constant current includes slight decreases in positive current. Since the abscissa of a function generator curve in FIG. 6 is average current, curve 160 progresses downwardly at a greater slope in section 160b following point 170. Before point 170, the two currents are mirror images with equal values as represented by lines 172, 174. These lines are at a set average current of about 75 amperes. After the current at point 170 is reached, the positive amplitude 176 is substantially greater than the negative amplitude 178. However, using the formula shown in FIG. 3 these two amplitudes still obtain the set average current at any positions along lines 160b, 162b. This basic aspect of the invention shown by the function generator curves in FIG. 6 is implemented as shown in FIG. 7. Welder B" is the same as the welder B' shown in FIG. 5, except synergic input device 150 for creating a signal on output line 150a to control relative duration along versions II and III is combined with second synergic input device 200. This second device performs this function illustrated in FIG. 6 by controlling the positive pulse by data on line 210 and the negative pulse by data on line 212. The set average current is determined by device 202 having output 204 directed to synergic devices 150, 200. These devices output the function generator curves of FIGS. 4 and 6. They control waveform generator 90 by the signals on lines 150a, 210 and 222. Waveform generator 90 outputs the waveform profile on line 92 and the polarity on line 94. These values are modified in accordance with the set current changing the outputs of synergic devices 150, 200. The function generator operation disclosed in FIG. 6 is the primary aspect of the invention. The function generator operation disclosed in FIG. 4 is merely ancillary. However, in accordance with one aspect of the present invention, they are combined as shown in FIG. 7. FIG. 8 illustrates a simplified version of welder B". Welder C has the same elements as the welder B" but is controlled only by synergic device 200. Welder C implements only the function generator shown in FIG. 6 constituting the primary concept of the present invention.

Figure 6A:
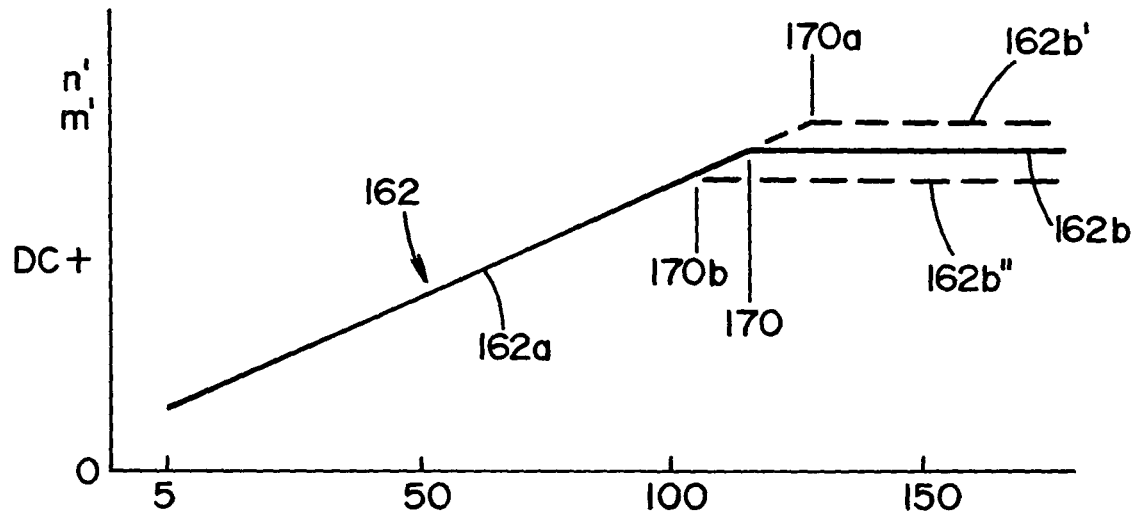
FIG. 6A is a graph as disclosed in FIG. 6 with a modification comprising an aspect of the invention.
Figure 6B:
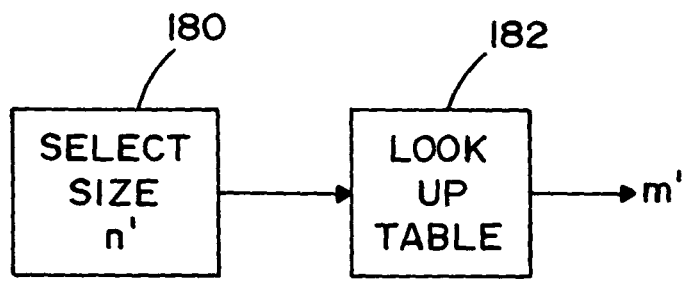
FIG. 6B is a block diagram of a digital circuit to perform the modification disclosed in FIG. 6A.

A broad aspect of the invention is shown in FIGS. 6A and 6B and involves a slight modification of the positive current curve of FIG. 6. Positive curve 162 is non-linear and transitions into constant, horizontal current portion 162b at point 170. In this manner, the positive cleaning current does not exceed the level causing electrode spitting. This current level changes with different diameters for electrode E. Consequently, horizontal line 162b is shifted vertically as the diameter of the electrode changes. With a larger electrode, level m' is increased to a higher value 162b' which is below the spitting current n' for the large electrode. This shift occurs at point 170a. When the electrode is smaller, the current is a horizontal portion or level 162b" commencing at point 170b. Thus, the maximum positive current for the TIG welding process is limited to a given level based upon the size of the electrode. If the set current is the average current, negative cure 160 reacts as shown in FIG. 6. When the set current is merely the penetrating current, curve 160 is a straight line as previously described. The broad aspect of the invention is implemented by a digital program using a circuit concept, such as disclosed in FIG. 6B. Select routine or program 180 communicates the size of the electrode to look-up table 182 to set the upper given value n' for use by waveform generator 90 in welder B" of FIG. 7.

Figures 9, 10, 12:
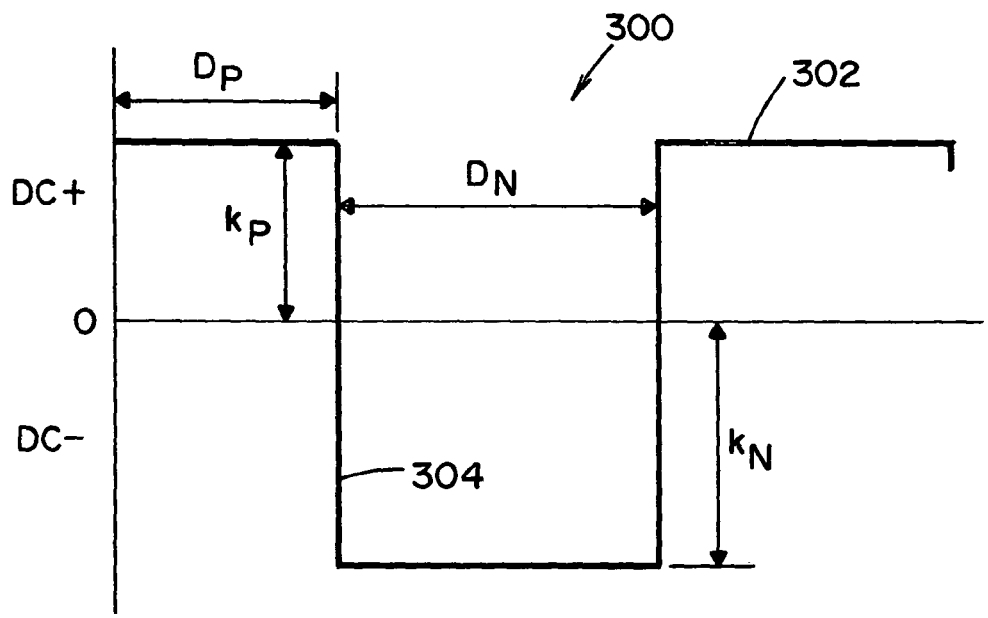
FIG. 9 is a graph of a standard current waveform used in TIG welding when controlling an inverter by a waveform generator as schematically illustrated in FIGS. 7 and 8 with certain parameters labeled for purposes of discussion.
FIG. 10 is a table of the parameters illustrated in FIG. 9 utilizing the single synergic device of the AC TIG welder shown in FIG. 8 combined with the additional synergic device shown in FIG. 12 and using the waveform parameters of FIG. 9.
FIG. 12 is a block diagram of an AC TIG welder having two synergic input devices for controlling the parameters of the AC waveform with the function generator curves schematically represented in FIG. 11.
Figure 11:
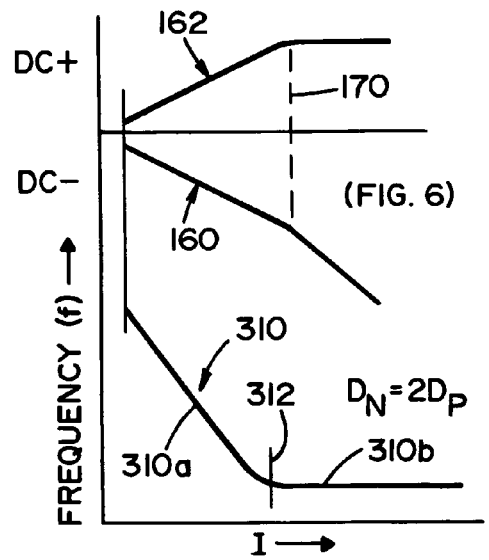
FIG. 11 is a graph of function generator curves for combined synergic control devices with function generators having the relationship as shown in FIG. 6 combined with a second function generator having a novel frequency relationship.
Figure 12:
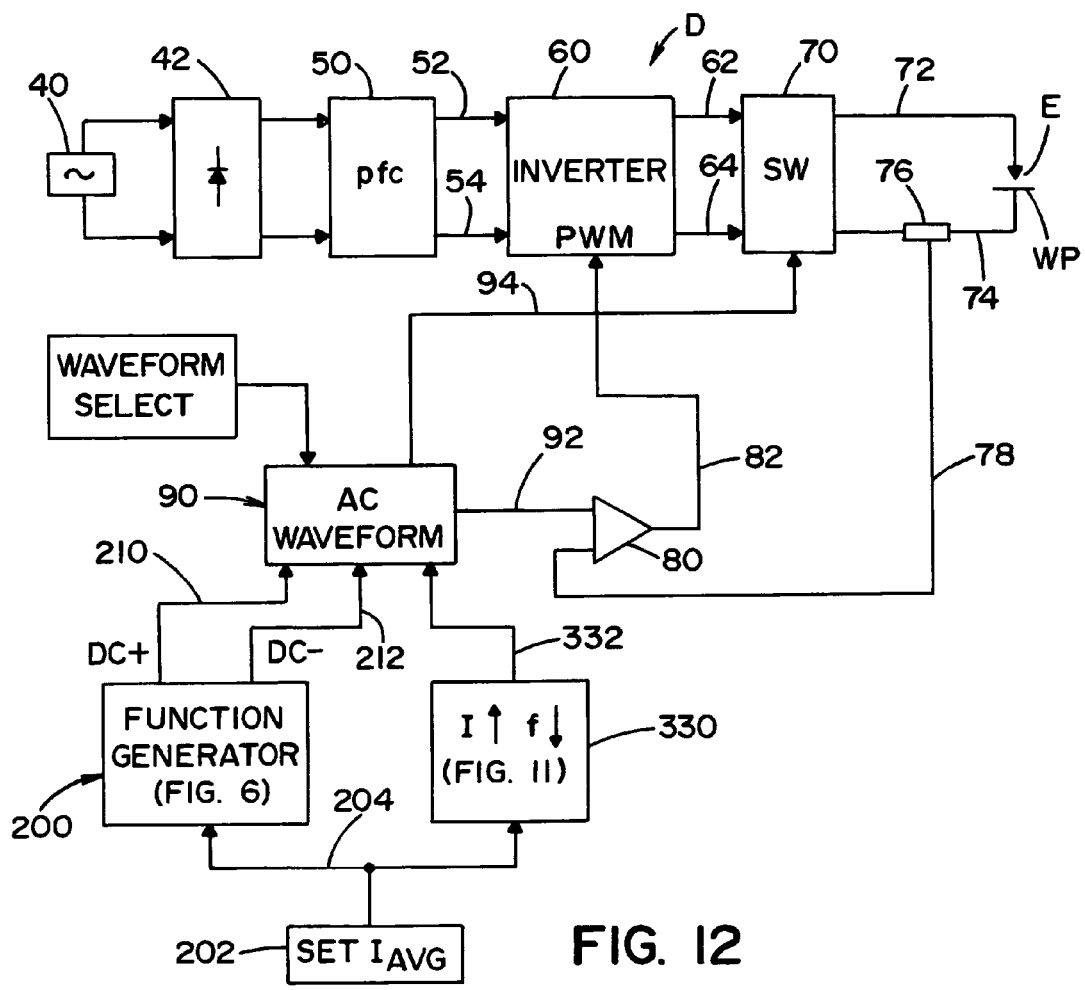

Waveform 300 shown in FIG. 9 is similar to the waveform F shown in FIG. 3. The amplitude of the positive current section 302 is $k_p$. Negative section 304 has an amplitude $k_N$. The positive duration of section 302 is $D_p$. As illustrated, the duration of section 304 is $D_N$. The table of FIG. 10 shows the relationship of amplitudes $k_p$, $k_N$ using the features illustrated in FIG. 6. In accordance with another aspect of the invention, frequency f of waveform 300 is controlled by a synergic device having a function relationship where a high frequency occurs at the minimum peak current. The function generator curve for frequency is shown in the bottom portion of FIG. 11. Frequency curve 310 has a straight line portion 310a with a large slope. The slope plunges frequency f to a low constant value indicated by horizontal line 310b. The frequency relationship or function shown in the bottom portion of FIG. 11 is combined with the current relationship or function shown in the upper portion of FIG. 11. This second function duplicates the function generator curve of FIG. 6. In the table of FIG. 10, the duration of the negative section 304 is twice the duration of the positive section. This is a fixed parameter. As shown in FIG. 11, at low currents, there is a very high frequency. This stabilizes the arc column. As the set current increases in the manner schematically illustrated in the table of FIG. 10, the current drastically decreases to low level 310b to prevent unwanted noise at high currents above the value shown as point 312. The broadest aspect of the present invention is shown in FIG. 8. Welder C of FIG. 8 is combined with a synergic device to output the function generator non-linear relationship of frequency shown in FIG. 11. In FIG. 12, welder D incorporates synergic input device 200 used in the welders of FIGS. 7 and 8 as well as another synergic input device 330. This device has an output 332 for controlling waveform generator 90. When the waveform processed by the digital controller of welder D incorporates the two function generator relationships shown in FIG. 11.

Figure 13:
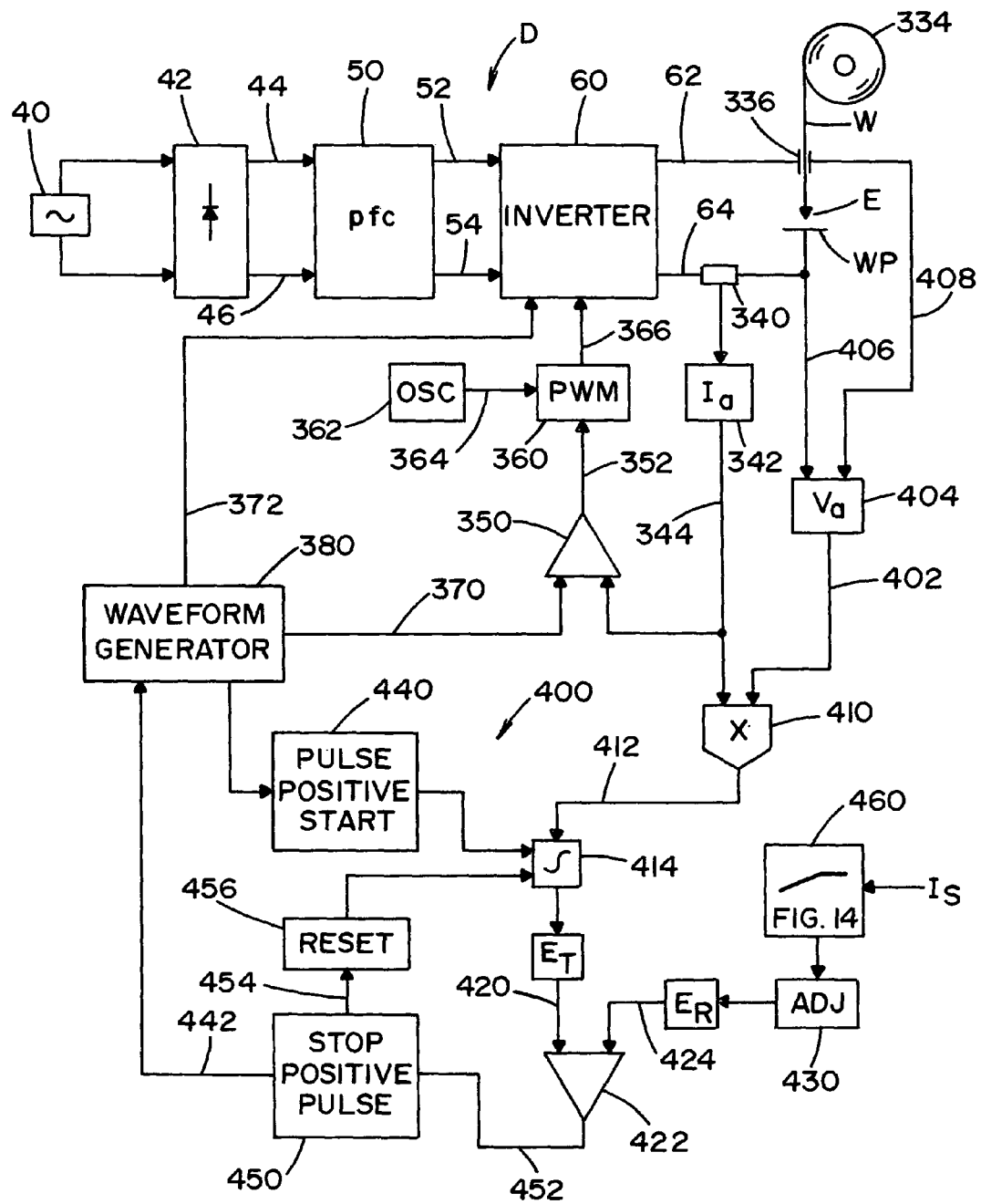
FIG. 13 is a block diagram schematically illustrating a TIG welder for adjusting the heat energy during the positive half cycle; and, FIG. 14 is a graph like shown in FIG. 6 with only the positive parameter curve shown.
Figure 14:
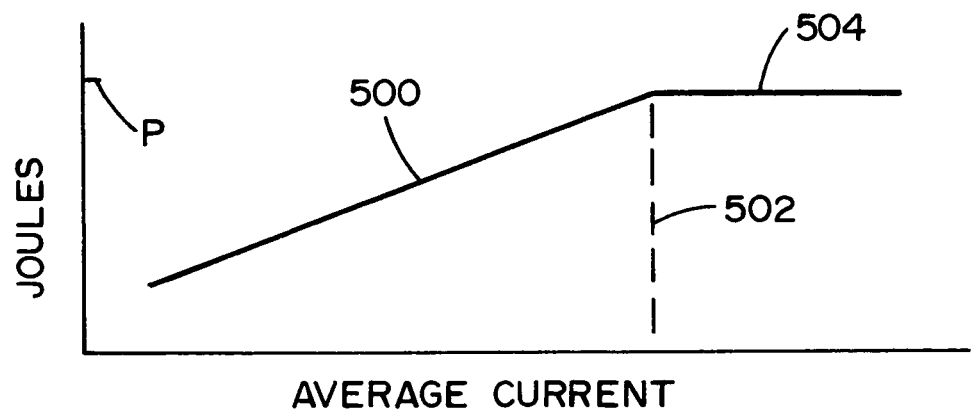

Limitation of the positive current section of the waveform to eliminate or limit spitting of molten metal on the tip of the electrode into the weld puddle is based upon heat or energy during the positive cycle. This is done in the preferred embodiment by merely limiting the positive current. A more direct technique is to limit the actual heat by adjusting energy in a synergic device as represented by curve 162 of FIG. 6. This energy control is accomplished by a standard welder D with an energy feedback, as shown in FIG. 13. Welder D is driven by AC supply 300 with a signal converted by rectifier 302 to create a first DC signal across lines 304, 306. Power factor correcting, boost or buck converter 310, with a second DC signal across lines 312, 314, drives high switching speed inverter 320. Output leads 322, 324 direct a given waveform across electrode E and workpiece WP. The electrode is a consumable wire W pulled from reel 330 and pushed through contact tip 332. Shunt 340 senses arc current by device 342 to provide a signal on line 344 representing the arc current. This arc current signal is one input to error amplifier 350 having output line 352 for a signal controlling pulse width modulator 360 operated at a frequency greater than about 18 kHz by oscillator 362 through line 364. The pulse width modulator creates a switching signal on line 366 to control the profile of the waveform. The control input of error amplifier 350 is on line 370 from waveform generator 380. The profile of the welding waveform is set by data on line 370, whereas the polarity of a section of the waveform is determined by logic on line 372. As so far described, welder D controls the welding process by current feedback. To control energy of the positive waveform section, welder D includes circuit 400 that receives the arc voltage signal on line 402 from device 404 having input sensing leads 406, 408. The voltage and current signals on lines 402, 344, respectively, are multiplied by multiplier stage 410 to produce an instantaneous watt signal on line 412. This value is integrated by digital stage 414 to give an accumulated energy $E_T$ as a value or number on line 420. Comparator 422 compares the actual value on line 420 with an adjusted energy value on line 424 as synergically correlated by device 430. Generator 380 starts integration by a program or routine 440 at the beginning of the positive section of the waveform and stops the positive section when $E_T$ equals adjusted $E_R$ as indicated by logic on line 442 from device 450. Device 450 receives a signal on line 452 from comparator 422 so routine or device 450 resets stage 414 by a reset signal on line 454. Welder D includes synergic device 460 or changing $E_R$ based upon set current $I_s$ as shown in FIG. 6. This preferred synergic relationship is changed to limit positive energy, as illustrated in FIG. 14. The adjusted energy of device 430 is controlled by a relationship programmed in synergic device 460, shown as curve 500. At point 502 the energy enters a constant energy value 504 below the heat energy p where molten metal will spit from a given sized electrode. FIGS. 13 and 14 show a change in the preferred embodiment, which limits positive current as the set current exceeds given value. An energy limit is more accurate and operates better at lower positive durations.

In summary, the present invention relates to an AC TIG welder of the type having a waveform generator for controlling the pulse width modulator of a high switching speed inverter type power source. In accordance with the invention, the waveform generator is controlled in accordance with standard technology, but also uses synergic input devices that regulate parameters of positive and negative portions of the waveform in accordance with the function generator curves implemented by the synergic devices. The set current, which current is preferably the average current but could be the negative penetration current of the TIG welder, determines selected parameters of the waveform as defined by a function generator curve.

Having thus defined the invention, the following is claimed:

1. A TIG welder comprising:
    a power source for performing an AC TIG welding process across an electrode and a workpiece, said power source having:
        a first output lead connected to said electrode, and
        a second output lead connected to said workpiece; and
    a controller for creating an AC waveform across said output leads, said AC waveform having a positive current section with a first duration and a peak positive current and a negative current section with a second duration and a peak negative current, said controller having:
        a synergic input device with an input for receiving a signal level representing a value for a desired set current for said welding process, and an output signal for determining an aspect of said AC waveform and for controlling a non-linear relationship between said peak positive current and said peak negative current based on said set current,
    wherein said non-linear relationship involves a generally constant positive peak current as said negative peak current is increased beyond a given value.

2. The TIG welder as defined in claim 1 wherein said constant positive peak current is in the range of 100-150 amperes.

3. The TIG welder as defined in claim 1 wherein said power source is an inverter operated at a frequency greater than 18 kHz and said AC waveform is created by a digital waveform generator controlling said inverter.

4. The TIG welder as defined in claim 1 wherein said first and second durations are generally equal.

5. The TIG welder as defined in claim 1 wherein said first and second durations are generally equal.

6. The TIG welder as defined in claim 1 wherein said second duration is substantially greater than said first duration.

7. The TIG welder as defined in claim 1 wherein said second duration is substantially greater than said first duration.

8. The TIG welder as defined in claim 1 wherein said controller has a second input device with an input receiving a signal representative of the desired set current for the welding process and an output signal determining an aspect of said waveform and representing a relationship between the first and second duration for certain desired set currents.

9. The TIG welder as defined in claim 1 wherein said controller has a second input device with an input receiving a signal representative of the desired set current for the welding process and an output signal determining an aspect of said waveform and representing a relationship between the first and second duration for certain desired set currents.

10. The TIG welder as defined in claim 1 wherein said controller has another input device with an input receiving a signal representative of the desired set current for the welding process and an output signal determining an aspect of said waveform and representing a relationship between the frequency of said waveform for certain desired set currents with the frequency decreasing from a high level frequency at a low set current as the desired set current increases until said frequency reaches a selected low level.

11. The TIG welder as defined in claim 1 wherein said controller has another input device with an input receiving a signal representative of the desired set current for the welding process and an output signal determining an aspect of said waveform and representing a relationship between the frequency of said waveform for certain desired set currents with the frequency decreasing from a high level frequency at a low set current as the desired set current increases until said frequency reaches a selected low level.

12. The TIG welder as defined in claim 1 wherein said set current is the average current of said welding process.

13. The TIG welder as defined in claim 1 wherein said set current is the average current of said welding process.

14. The TIG welder as defined in claim 1 including a circuit to limit said positive current section to a given amount.

15. The TIG welder as defined in claim 1 including a circuit to limit the energy of said positive current section to a given amount.

16. The TIG welder as defined in claim 1 including:
    a circuit to limit said positive peak current to a given level based on said set current.

17. The TIG welder as defined in claim 1 including:
    a circuit to limit the energy of said positive current section to a given level based on said set current.

18. The TIG welder as defined in claim 2 wherein said power source is an inverter operated at a frequency greater than 18 kHz and said AC waveform is created by a digital waveform generator controlling said inverter.

19. The TIG welder as defined in claim 2 wherein said first and second durations are generally equal.

20. The TIG welder as defined in claim 2 wherein said second duration is substantially greater than said first duration.

21. The TIG welder as defined in claim 2 wherein said controller has a second input device with an input receiving a signal representative of the desired set current for the welding process and an output signal determining an aspect of said waveform and representing a relationship between the first and second duration for certain desired set currents.

22. The TIG welder as defined in claim 2 wherein said controller has another input device with an input receiving a signal representative of the desired set current for the welding process and an output signal determining an aspect of said waveform and representing a relationship between the frequency of said waveform for certain desired set currents with the frequency decreasing from a high level frequency at a low set current as the desired set current increases until said frequency reaches a selected low level.

23. The TIG welder as defined in claim 2 wherein said set current is the average current of said welding process.

24. The TIG welder as defined in claim 3 wherein said first and second durations are generally equal.

25. The TIG welder as defined in claim 3 wherein said second duration is substantially greater than said first duration.

26. The TIG welder as defined in claim 3 wherein said controller has a second input device with an input receiving a signal representative of the desired set current for the welding process and an output signal determining an aspect of said waveform and representing a relationship between the first and second duration for certain desired set currents.

27. The TIG welder as defined in claim 3 wherein said controller has another input device with an input receiving a signal representative of the desired set current for the welding process and an output signal determining an aspect of said waveform and representing a relationship between the frequency of said waveform for certain desired set currents with the frequency decreasing from a high level frequency at a low set current as the desired set current increases until said frequency reaches a selected low level.

28. The TIG welder as defined in claim 3 wherein said set current is the average current of said welding process.

29. The TIG welder as defined in claim 5 wherein said set current is the average current of said welding process.

30. The TIG welder as defined in claim 7 wherein said controller has a second synergic input device with an input receiving a signal representative of the desired set current for the welding process and an output signal determining an aspect of said waveform and representing a relationship between the first and second duration for certain desired set currents.

31. The TIG welder as defined in claim 7 wherein said set current is the average current of said welding process.

32. The TIG welder as defined in claim 9 wherein said controller has another synergic input device with an input receiving a signal representative of the desired set current for the welding process and an output signal determining an aspect of said waveform and representing a relationship between the frequency of said waveform for certain desired set currents with the frequency decreasing from a high level frequency at a low set current as the desired set current increases until said frequency reaches a selected low level.

33. The TIG welder as defined in claim 9 wherein said set current is the average current of said welding process.

34. The TIG welder as defined in claim 11 wherein said set current is the average current of said welding process.

35. The TIG welder as defined in claim 14 wherein said given amount is adjusted based upon the size of said electrode.

36. The TIG welder as defined in claim 15 wherein said given amount is adjusted based upon the size of said electrode.

37. The TIG welder as defined in claim 16 wherein said given level is in the range of 100-150 amperes.

38. The TIG welder as defined in claim 16 including a circuit to adjust said given level based upon the size of said electrode.

39. The TIG welder as defined in claim 17 wherein said given level is in the range of 2-5 Joules.

40. The TIG welder as defined in claim 17 including a circuit to adjust said given level based upon the size of said electrode.

41. The TIG welder as defined in claim 18 wherein said first and second durations are generally equal.

42. The TIG welder as defined in claim 18 wherein said second duration is substantially greater than said first duration.

43. The TIG welder defined in claim 18 wherein said controller has a second input device with an input receiving a signal representative of the desired set current for the welding process and an output signal determining an aspect of said waveform and representing a relationship between the first and second duration for certain desired set currents.

44. The TIG welder as defined in claim 18 wherein said controller has another input device with an input receiving a signal representative of the desired set current for the welding process and an output signal determining an aspect of said waveform and representing a relationship between the frequency of said waveform for certain desired set currents with the frequency decreasing from a high level frequency at a low set current as the desired set current increases until said frequency reaches a selected low level.

45. The TIG welder as defined in claim 18 wherein said set current is the average current of said welding process.

46. The TIG welder as defined in claim 37 including a circuit to adjust said given level based upon the size of said electrode.

47. The TIG welder as defined in claim 39 including a circuit to adjust said given level based upon the size of said electrode.

48. A TIG welder comprising;
a power source for performing an AC TIG welding process across an electrode and a workpiece, said power source having:
   a first output lead connected to said electrode, and
   a second output lead connected to said workpiece; and
a controller for creating an AC waveform across said output leads, said AC waveform having a positive current section with a first duration and a peak positive current and a negative current section with a second duration and a peak negative current, said controller having:
   an input device with an input for receiving a signal representative of a value for a desired set current for the welding process, and an output signal for determining an aspect of said AC waveform and for controlling a relationship between a frequency of said AC waveform and said desired set current,
wherein the relationship involves the frequency decreasing, from a high level frequency at a low set current until said frequency reaches a selected low level, as said desired set current increases.

49. The TIG welder as defined in claim 48 wherein said power source is an inverter operated at a frequency greater than 18 kHz and said AC waveform is created by a digital waveform generator controlling said inverter and the relationship is a decrease in frequency with an increase in the set current.

50. The TIG welder as defined in claim 48 wherein said first and second durations are generally equal.

51. The TIG welder as defined in claim 48 wherein said second duration is substantially greater than said first duration.

52. The TIG welder as defined in claim 48 wherein said controller has a second input device with an input receiving a signal representative of the desired current for the welding process and an output signal determining an aspect of said waveform and representing a relationship between the first and second duration for certain desired set currents.

53. The TIG welder as defined in claim 49 wherein said first and second durations are generally equal.

54. The TIG welder as defined in claim 49 wherein said second duration is substantially greater than said first duration.

55. The TIG welder as defined in claim 49 wherein said set current is the average current of said welding process.

56. The TIG welder as defined in claim 52 wherein said set current is the average current of said welding process.

57. A TIG welder comprising:
a power source for performing an AC TIG welding process across an electrode and a workpiece, said power source having:
  a first output lead connected to said electrode, and
  a second output lead connected to said workpiece; and
a controller for creating an AC waveform across said output leads, said AC waveform having a positive current section with a first duration and a peak positive current and a negative current section with a second duration and a peak negative current, said controller having:
  an input device with an input for receiving a signal level representing a value for a desired set current for said welding process, and an output signal for determining an aspect of said AC waveform and for controlling a relationship between said positive current duration and said negative current duration based on said set current, wherein said relationship is not a direct linear relationship,
wherein said relationship involves one of:
  a generally constant positive duration as said negative duration is increased beyond a given value,
  a generally constant positive duration as said negative duration is increased with the set current, and
  a reduction in the positive duration as said negative duration is increased with the set current.

58. The TIG welder as defined in claim 57 wherein said set current is the average current of said welding process.

* * * * *